Sept. 7, 1926. 1,598,746
G. ROES
METHOD AND APPARATUS FOR PHOTOGRAPHIC FLASHING
Filed Dec. 8, 1922
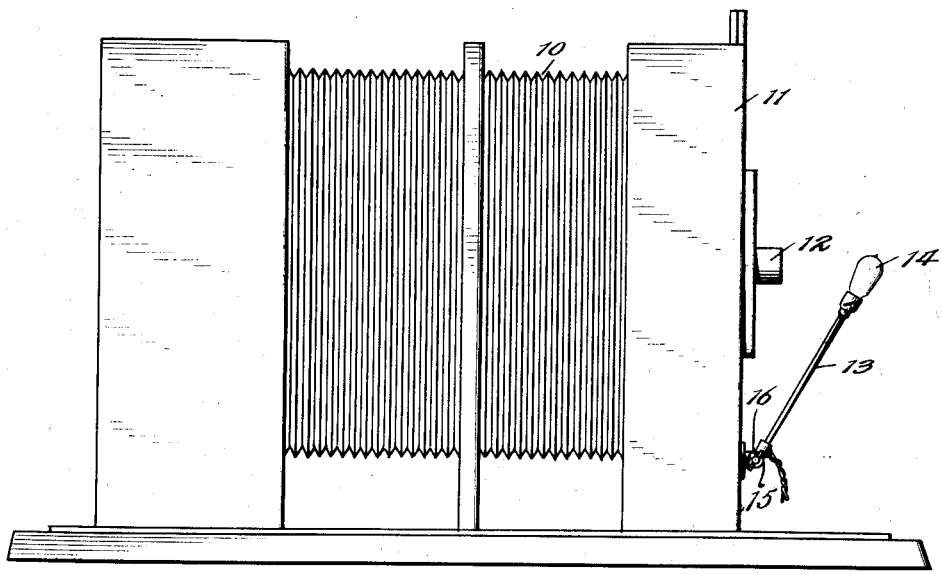
INVENTOR
George Roes
BY
Warren S. Orton.
ATTORNEYS Patented Sept. 7, 1926.

1,598,746

UNITED STATES PATENT OFFICE.

GEORGE ROES, OF RIDGEFIELD PARK, NEW JERSEY.

METHOD AND APPARATUS FOR PHOTOGRAPHIC FLASHING.

Application filed December 8, 1922. Serial No. 605,746.

The invention relates in general to an improvement in the art of photography, and specifically relates to an improved method of photographing objects to obtain a soft effect in the dark parts of the resulting picture.

It is a usual practice in preparing half-tone negatives to make three exposures of the still object being photographed. The first step is to make the exposure with the lens in relatively wide open position. The second step is to make the second exposure with the stop set relatively small, and for the third exposure a white sheet, termed a flash sheet, is positioned between the object and the lens and a brief exposure is made of the same. This last step is known as a flashing and has the result of toning down or clouding the shadows or dark parts on the resulting picture so as to give a softening modification to well known half-tone effect on the picture.

It has been found to be quite inconvenient to manipulate this sheet for it not infrequently happens that it is of large area, bulky and difficult to move and frequently must be assembled as a plurality of separate parts in the case of a large object and as it is positioned immediately in front of the object being photographed and at a distance from the camera, there is a necessity for the operator to move back and forth between the camera and the sheet. Further, the sheet which not infrequently is simply a large sheet of paper, becomes dirty and rumpled and detracts from the uniformity of the effect desired on the resulting picture. With different objects being photographed it is a customary practice to provide different sized sheets to accommodate the field of vision of the camera when placed at its verying distances from the object and with each re-arrangement of camera and sheet, there is a necessary readjustment of the light usually employed to illuminate the object and sheet, all of which renders the old method both inconvenient and expensive.

The primary object of the invention is to provide a simplified and easily practiced method of toning down the darker portions of the half-tone effects photographically, and at the same time to effect an economy both in the time lapse necessary to achieve the desired effect, to attain economy in the labor necessary to effect the desired flashing step, and to effect an economy in the apparatus necessary to practice the flashing method.

Broadly, I achieve this phase of the invention by positioning a source of light for a brief period of time in the optic axis of the camera and between the objective lens and its focus.

Referring to the mechanical features of the disclosure, an object of the invention is to provide a simple means for conveniently locating a source of light, hereinafter referred to as a flash lamp, in operative position relative to the camera when desired and for removing the lamp quickly out of the way to permit the continued normal operation of the camera.

Various other objects and advantages of the invention will be obvious from a consideration of the preferred method of practicing the invention hereinafter described and from an inspection of the accompanying drawings and in part will be more fully set forth in the following particular description of one method and of one form of apparatus for practicing the method and the invention also consists in certain new and novel operations and features of construction and combination of parts hereinafter set forth and claimed.

In the following description and in the claims, parts will be identified by specific names for convenience of expression but they are intended to be as generic in their application to similar parts as the art will permit.

In the accompanying drawings the figure is a view in side elevation of a camera of conventional form, shown largely in diagrammatic outline and equipped with an attachment co-acting therewith to constitute a preferred embodiment of the invention.

In the drawing there is shown a camera 10 which includes a front frame 11 carrying an objective lens 12, all as is well known in cameras of the type usually employed for photographing still objects.

Mounted on the frame 11 is a bracket 13 which carries a source of light 14 herein identified as a flashing lamp and which preferably is in the form of an electric light bulb. The bracket is secured to the frame 11 preferably by means of a universal joint 15 so that the flashing lamp may be moved into operative position in advance of and relatively close to the objective lens 12 so that it will be removed from the focus of the lens and positioned between the lens and the object being photographed. The lamp may be locked in both its operative and in its inoperative positions by a thumb nut 16 securing the parts of the joint 15. When not in use the flash lamp may be moved into an inoperative position out of the optic axis of the camera and into a position offset from the camera. Preferably this position will be toward the left side of the camera as the operator usually works from the right side of the camera.

In operation it will be understood that the half-tone negative is produced following the usual method practiced in so far as the photographing of the object is concerned. Then instead of placing the flash sheet between the lens and object, the operator simply swings the flashing lamp into its operative position and floods the sensitized and previous exposed plate with a strong light for a short period of time, usually ten to thirty seconds, depending upon the intensity of clouding effect desired on the resulting photograph. The time duration of this flashing operation is most conveniently regulated by utilizing the timing mechanism common with camera of this character, but it is within the scope of this disclosure to regulate the flashing by the operation of a suitable control for the lamp.

By following the method herein disclosed it is possible to eliminate the use of the usual flash sheet, together with the inconvenience and expense associated with the use of such devices. The method herein described can be practiced rapidly for the operator need not move from his position adjacent the camera but can manipulate the camera in its photographing steps and quickly swing the flashing lamp to and from its operative position when required.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In the art of producing half-tone negatives photographically, the method which includes the step of subjecting the sensitized plate while in a camera and after it has been exposed to take the desired picture to the subsequent action of a flood of intense light projected thereon directly from the light source for a brief period of time.

2. In the art of producing half-tone negatives photographically, the method which consists in photographing the object and then subjecting the resulting sensitized plate to the action of an intense direct and non-reflected light.

3. In the art of photography, the method which consists in photographing the object and then subjecting the sensitized plate when so treated to the action of a source of light distributed across the field of the plate with the field exposed directly to the source of the light.

4. In the art of producing half-tone negatives photographically, the method which includes photographing the object, positioning a source of light in the optic axis of the camera and between the camera lens and its object focus and removed from the focus of the camera lens and in position to flood the sensitized plate with light projected thereon directly from the light source and flooding the sensitized plate with light, from such light source.

5. In a camera device, the combination of a camera, a camera lens, a source of light exposed directly to the lens and means for positioning said light source exterior of the camera in the optic axis of, and in advance of, the lens.

6. In a camera device, the combination of a camera having an objective lens, and a source of light exterior of the camera, movable to and from an operative position in advance of the lens and discharging its light rays directly into the lens thereby to produce a half-tone effect on the sensitized body in the camera.

7. A camera provided with means producing a half-tone effect and including a source of light for flooding the entire sensitized plate in a substantially uniform distribution of direct light.

8. A camera provided with an objective lens, and a source of light movable to and from an operative position in advance of the lens for flooding the sensitized plate with light, said operative position being between the lens and the object focus of the lens and relatively close to the lens.

9. A camera, a bracket pivotally mounted on the camera, an electric light flash lamp mounted on the bracket and movable therewith to and from an operative position in the optic axis of the camera.

Signed at New York city, in the county of New York and State of New York this 7th day of December, A. D. 1922.

GEORGE ROES.